United States Patent
Dittman

(10) Patent No.: US 12,052,937 B2
(45) Date of Patent: Aug. 6, 2024

(54) DETECTORIST SHOVEL DEVICE

(71) Applicant: Casey Dittman, Sandy, UT (US)

(72) Inventor: Casey Dittman, Sandy, UT (US)

(*) Notice: Subject to any disclaimer, the term of this patent is extended or adjusted under 35 U.S.C. 154(b) by 166 days.

(21) Appl. No.: 17/531,330

(22) Filed: Nov. 19, 2021

(65) Prior Publication Data

US 2022/0151125 A1    May 19, 2022

Related U.S. Application Data

(60) Provisional application No. 63/115,853, filed on Nov. 19, 2020.

(51) Int. Cl.
| | | |
|---|---|---|
| *A01B 1/04* | (2006.01) | |
| *A01B 1/02* | (2006.01) | |
| *A01B 1/22* | (2006.01) | |

(52) U.S. Cl.
CPC ............... *A01B 1/04* (2013.01); *A01B 1/024* (2013.01); *A01B 1/22* (2013.01)

(58) Field of Classification Search
CPC ....... A01B 1/022; A01B 1/024; A01B 1/1026; A01B 1/04; A01B 1/22; A01B 1/227
USPC ...................................................... 294/51, 57
See application file for complete search history.

(56) References Cited

U.S. PATENT DOCUMENTS

| | | | | |
|---|---|---|---|---|
| 1,029,967 A | * | 6/1912 | Bolin et al. ............... | B25G 3/02 16/440 |
| 1,051,042 A | * | 1/1913 | Wiener ................... | A01B 1/022 30/146 |
| 1,906,218 A | * | 4/1933 | Patchell .................... | B25G 3/02 403/100 |
| 2,047,485 A | | 5/1935 | Mcbrady | |
| 3,226,149 A | * | 12/1965 | Mcjohnson .............. | A01B 1/04 294/51 |

(Continued)

FOREIGN PATENT DOCUMENTS

| | | | |
|---|---|---|---|
| CN | 106561088 A | * | 4/2017 |
| EP | 1785023 A1 | | 5/2007 |

(Continued)

OTHER PUBLICATIONS

Suncast.com, Suncast-reg-20-inch-powerblade-snow-shovel, https://www.suncast.com/sce2700.html, (no date).

(Continued)

*Primary Examiner* — Dean J Kramer
(74) *Attorney, Agent, or Firm* — Bryant J. Keller; Kirton McConkie

(57) ABSTRACT

While the described shovel can include any suitable component, in some cases, it includes a blade, a shaft, a handle, a handgrip, and/or a coupling component. In some cases, the handgrip is located at a center of weight of the shovel, with substantially half of the shovel's weight distributed on each side of the handgrip. In some cases, the shaft is oriented at an angle relative to the blade and the handle is oriented at an angle relative to the shaft. In some cases, the coupling component is located along the shaft and is configured to selectively and removably connect at least a first modular section of the shaft to a second modular section of the shaft. In some cases, the coupling component is configured to only fully engage when the first and second modular sections are in a single orientation with respect to each other. Other implementations are described.

20 Claims, 12 Drawing Sheets

(56) References Cited

U.S. PATENT DOCUMENTS

| | | |
|---|---|---|
| 3,401,971 A | 9/1968 | W. Cronquist |
| 3,473,712 A | 10/1969 | Genchi |
| 4,162,132 A | 7/1979 | Kress et al. |
| 267,468 A | 1/1983 | Simms |
| D267,468 S | 1/1983 | Simms |
| 4,424,977 A | 1/1984 | Jackson |
| 4,772,057 A | 9/1988 | Harvey |
| D298,205 S | 10/1988 | Pollak |
| 5,383,696 A | 1/1995 | Speier |
| 5,507,051 A | 4/1996 | Mazon |
| 5,533,768 A | 7/1996 | Mitchell |
| 5,676,412 A | 10/1997 | Kahley |
| D395,211 S | 6/1998 | Linden et al. |
| 5,795,000 A | 8/1998 | Aldorasi |
| 5,799,996 A * | 9/1998 | Fredrickson ............ A01B 1/20 294/51 |
| 5,810,408 A * | 9/1998 | Armstrong ........... A46B 5/0075 294/51 |
| 6,003,915 A | 12/1999 | Bierman |
| 6,199,245 B1 * | 3/2001 | Blessing ................ B25G 1/102 16/901 |
| 6,328,361 B1 | 12/2001 | Spear |
| 6,357,067 B1 | 3/2002 | Jones |
| 6,412,843 B1 | 7/2002 | Burbrink et al. |
| 6,560,805 B2 | 5/2003 | Dallas et al. |
| 7,017,234 B2 | 3/2006 | Anderson |
| 7,559,591 B1 * | 7/2009 | DeSanti ................... E01H 5/02 294/54.5 |
| 7,571,945 B2 | 8/2009 | Walker et al. |
| D644,907 S | 9/2011 | Blanchard |
| D644,908 S | 9/2011 | Blanchard |
| D653,931 S | 2/2012 | Blanchard |
| 8,322,764 B2 | 12/2012 | Miller et al. |
| 8,387,188 B2 | 3/2013 | Murphy |
| 8,627,549 B2 * | 1/2014 | Vernieu ................... B29C 63/18 74/551.9 |
| 8,746,767 B2 | 6/2014 | Mouch et al. |
| 8,820,806 B1 | 9/2014 | Seits |
| 9,039,054 B1 * | 5/2015 | French ..................... A01B 1/02 294/54.5 |
| 9,050,717 B2 | 6/2015 | Mouch et al. |
| 9,402,337 B2 | 8/2016 | Al-Taweel |
| 9,622,396 B1 | 4/2017 | Dunkley-Davis |
| 9,662,779 B1 | 5/2017 | Yancey |
| 9,670,632 B2 | 6/2017 | Behan |
| 2008/0309106 A1 * | 12/2008 | Baker ...................... A01B 1/04 294/49 |

FOREIGN PATENT DOCUMENTS

| | | |
|---|---|---|
| WO | WO 91/17647 * | 11/1991 |
| WO | 2015/019326 A2 | 2/2015 |

OTHER PUBLICATIONS

Amazon.com, Lesche-t-handle-31-heavy-duty-metal-detector-shovel- double-serrated-blade, https://www.amazon.com/LY1122-Lesche-Handle-Detector-Serrated/dp/B07Y18ZVBT, (no date).

Amazon.com, FiveJoy Survival Shovel Multitool-Portable Collapsible Tactical Tool-Entrenching Backpack Equipment for Hiking Camping Emergency Car—https://www.amazon.com/FiveJoy-Military-Folding- Shovel-Multitool/dp/B014FOQL3K, (no date).

Sears.com, Whites-digmaster-digging-tool-double-sided-serrated-blade- sheath, https://www.sears.com/white-s-electronics-whites-digmaster-double-serrated-digging-tool/p-SPM12306472130, (no date).

* cited by examiner

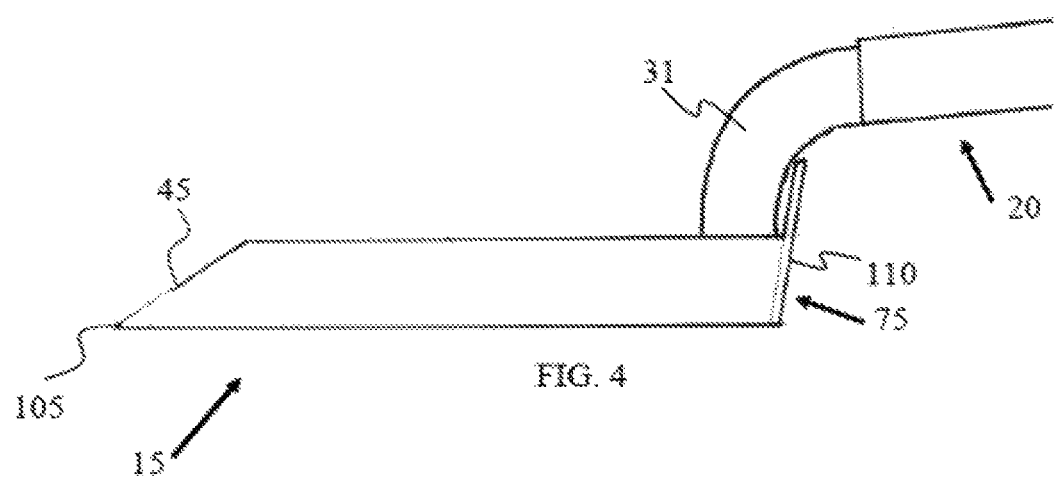
FIG. 4
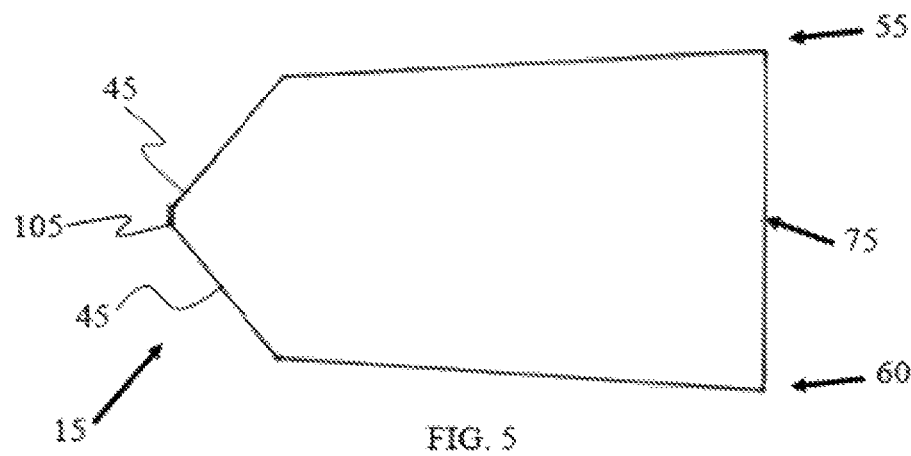
FIG. 5
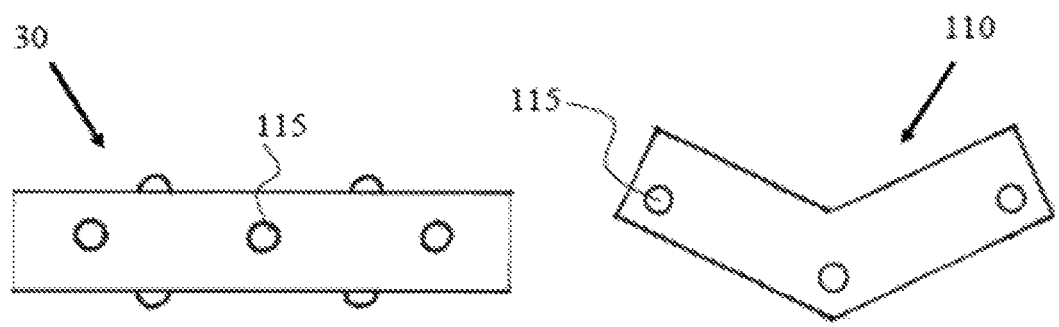
FIG. 6
FIG. 7

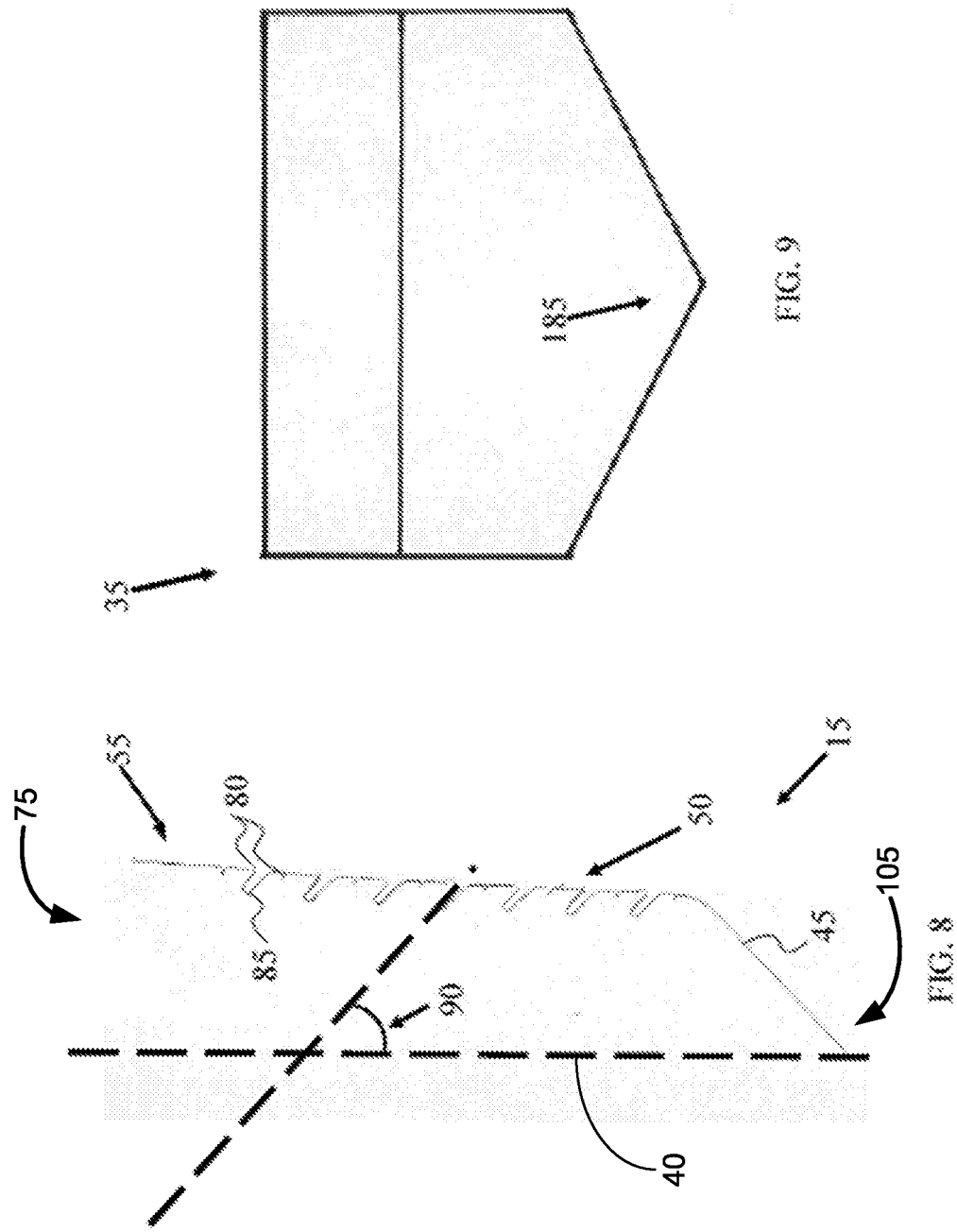

DETECTORIST SHOVEL DEVICE

CROSS-REFERENCE TO RELATED APPLICATION

This application claims priority to U.S. Provisional Patent Application Ser. No. 63/115,853, filed Nov. 19, 2020, and entitled "DETECTORISTS SHOVEL DEVICE"; the entire disclosure of which is hereby incorporated by reference.

BACKGROUND OF THE INVENTION

Field of the Invention

The present invention relates to shovels. More particularly, some implementations of the described invention relate to detectorist, metal detectorist, and/or treasure hunting shovels. While the described shovels can include any suitable component, in some cases, they include a blade, a shaft, a handle, a handgrip, a coupling component, a collar, and/or any other suitable component. In some cases, the handgrip is located at a center of a weight of the shovel, such that approximately half of a weight of the shovel is distributed on each side of the handgrip (e.g., on each side of a center of the handgrip). In some cases, the shaft is oriented at an angle relative to the blade, and the handle is optionally oriented at an angle relative to the shaft. In some cases, the coupling component is located along the shaft and is configured to selectively and removably connect at least a first modular section of the shaft to a second modular section of the shaft. In some cases, the coupling component is configured to only fully engage when the first modular section and the second modular section are in a single orientation with respect to each other.

Background and Related Art

Shovels are common in many industries such as farming, ranching, construction, and recreation to move material (e.g., dirt, manure, rocks, snow, etc.) from one place to another. Overtime, shovels have evolved to accomplish a variety of specific tasks. In some cases, shovels are used by metal detectorists and treasure hunters to unearth relics, precious metals, and other buried treasure.

In practicing their craft, metal detectorists often spend long hours (in some cases, eight to ten hours per day) carrying their shovel and searching for treasure in various environments, including in deserts, mountains, parks, schools, lakes, golf courses, and yards. Metal detectorists often dig through challenging terrain to retrieve buried treasure. This challenging terrain can include untilled ground with tree and underbrush roots, grassy turf, hard clay, sand, gravel, and rocks.

Indeed, metal detectorists and other industrial operators often use various types of shovels. However, these shovels can be cumbersome and heavy. Additionally, some shovels are hard to use, can damage turf, can unduly fatigue their users, and/or can be relatively ineffective at digging through soil that contains roots or rocks.

Thus, while devices currently exist that are used to unearth treasures and other materials by metal detectorists and treasure hunters, some challenges still exist, including those listed above. Accordingly, it would be an improvement in the art to augment or even replace current devices with other devices.

SUMMARY OF THE INVENTION

The present invention relates to shovels. More particularly, some implementations of the described invention relate to detectorist, metal detectorist, and/or treasure hunting shovels. While the described shovels can include any suitable component, in some cases, they include a blade, a shaft, a handle, a handgrip, a coupling component, a collar, and/or any other suitable component. In some cases, the handgrip is located at a center of a weight of the shovel, such that approximately half of a weight of the shovel is distributed on each side of the handgrip (e.g., on each side of a center of the handgrip). In some cases, the shaft is oriented at an angle relative to the blade, and the handle is optionally oriented at an angle relative to the shaft. In some cases, the coupling component is located along the shaft and is configured to selectively and removably connect at least a first modular section of the shaft to a second modular section of the shaft and/or to any other suitable component (e.g., a handle). In some cases, the coupling component is configured to only fully engage when the first modular section and the second modular section (and/or other component) are in a single orientation with respect to each other.

In some implementations, the blade optionally includes one or more serrated teeth that are disposed at one or more lateral sides of the blade. Indeed, in some cases, the blade includes a plurality of teeth on at least a portion of one or both lateral edges of the blade. While such teeth can perform any suitable function, in some cases, the serrated teeth are configured to allow the blade to cut through underbrush roots and/or other obstructions when digging.

In some implementations, the blade includes a cutting edge or end that creates a tip and/or a cutting blade at a bottom end of the shovel. Additionally, in some implementations, the blade includes a kick plate located on a heel end of the blade, opposite (or substantially opposite) to the cutting edge. With respect to the kick plate, the kick plate can comprise any suitable feature that allows a user to force the user's foot against the kick plate to help force the cutting edge of the shovel into dirt and/or any other suitable material. Indeed, in some cases, the kick plate comprises one or more raised surfaces that are configured to provide texture and traction to the kick plate (e.g., so as to keep the user's foot from sliding off the kick plate). In some cases, the kick plate comprises one or more raised tack welds.

In some cases, the shaft of the shovel includes at least a first modular section and a second modular section that are configured to selectively couple to, and to decouple from, each other via one or more coupling components. In this regard, the coupling component can function in any suitable manner and can allow the first and second modular sections (and/or any other suitable component) to couple to each other in any suitable orientation. In some implementations, however, the coupling component is configured to selectively and removably allow at least the first modular section of the shaft to fully couple with the second modular section of the shaft (and/or any other suitable component) in only a single rotational orientation with respect to each two modular sections (and/or other component).

In some cases, instead of (or in addition to) coupling two modular sections of the shaft together, the coupling component is configured to selectively and removably connect one section or more sections of the shaft with any other suitable component, including, without limitation, to one or more handles, shaft portions having an extended length, shaft portions that are relatively short, blades, axe heads, hammer heads, spear tips, pry bars, crowbars, levers, rakes, hoes, pick axes, mattocks, scythes, metal detectors, magnets, trowels, pitch forks, hand digger blades, canes, feet, D-handles, T-handles, handles, saw blades, and/or to any other suitable component.

The blade and the shaft can couple to each other in any suitable manner. In some cases, the shaft couples directly to the blade (e.g., via a or more welds, fasteners, frictional engagements, mechanical engagements, double end D style spring leg snap buttons of any suitable size (e.g., 0.250" D×0.280" H), and/or in any other suitable manner). In some other cases, however, one or more intermediary components, hosels, and/or collars couple the shaft to the blade. In this regard, some embodiments of suitable intermediary components (or collars) include, but are not limited to, one or more bars, springs, elastic materials that are configured to recover their shape after being bent, rods, coil springs, segments of coil springs, arched segments, arched spring materials, and/or any other suitable component that is configured to couple the shaft to the blade. Indeed, in some cases, the shovel comprises a spring (or a resilient member) that connects the shaft to the blade.

While the handgrip can be disposed at any suitable location on the shovel, in some cases, the handgrip is located on the shaft at a center of a weight of a length of the shovel, such that a weight of the shovel from the handgrip to a bottom end of the shovel is substantially equal to a weight of the shovel from the handgrip to a top end (e.g., a handle end) of the shovel. In this regard, locating the handgrip in such a way can perform a variety of functions, including, without limitation, creating a balanced handhold to carry the shovel and, thus, to reduce strain and exhaustion on the user.

In some implementations, the blade includes a first longitudinal axis that extends along a length of at least a portion of the blade. Additionally, in some implementations, the shaft includes a second longitudinal axis that extends along at least a portion of a length of the shaft. Moreover, in some implementations, the handle includes a third longitudinal axis that extends along a length of at least a portion of the handle. While the longitudinal axes of the various portions of the shovel can run at any suitable any with respect to each other (e.g., being parallel to, perpendicular to, running at intersecting angles, and/or at any other suitable angle with respect to each other), in some cases, one or more of the longitudinal axes of the shovel run at an angle (e.g., an intersecting angle) with respect to at least one other longitudinal axis of the shovel. In this regard, while creating an angle between the blade and the shaft, and/or between the shaft and the handle, can perform any suitable function, in some cases, it increases an operator's leverage when using the shovel.

In some cases, the second longitudinal axis of the shaft is oriented at an angle relative to the first longitudinal axis of the blade. Indeed, in some embodiments, an angle between the first longitudinal axis and the second longitudinal axis is between about 0 degrees (e.g., the two axes being parallel with each other) and about 40 degrees (or within any subrange thereof). In some cases, for instance, the angle between the first longitudinal axis and the second longitudinal axis is about 13 degrees (±5 degrees).

While the third longitudinal axis of the handle can run at any suitable angle with respect to the second longitudinal axis of the shaft, in some cases, those two longitudinal axes run at an angle, with respect to each other, that is between about 0 degrees (e.g., the two axes being parallel with each other) and about 60 degrees, or within any subrange thereof. Indeed, in some cases, the third longitudinal axis of the handle and the second longitudinal axis of the shaft run, with respect to each other, at an angle of about 27 degrees (±5 degrees).

While the described shovel can be particularly useful for unearthing relics, precious metals, bottles, coins, jewelry, antiques, and other buried treasure, those skilled in the art will appreciate that the described systems and methods can be used in a variety of different applications and in a variety of different areas of manufacture. For instance, the described device can be used not only by metal detectorists, but some implementations of the described shovel are configured to be used in any other suitable location or application such as farming, gardening, ranching, construction, recreation, backpacking, emergency kits, as a cane, and/or in any other suitable field of use.

These and other features and advantages of the described shovel will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the described invention will be rendered by reference to specific embodiments thereof, which are illustrated in the appended drawings. Understanding that the drawings are not necessarily drawn to scale or in proper proportion, and that the drawings depict only typical embodiments of the present inventions and are not, therefore, to be considered as limiting the scope of the inventions, the present invention will be described and explained with additional specificity and detail through the use of the accompanying drawings in which:

FIG. 4 illustrates a side elevation view of the blade including a kick plate and a collar, in accordance with a representative embodiment;

FIG. 5 illustrates a top plan view of the blade, in accordance with a representative embodiment;

FIG. 6 illustrates a side elevation view of the handgrip, in accordance with a representative embodiment;

FIG. 7 illustrates a top plan view of the kick plate, in accordance with a representative embodiment;

FIG. 8 illustrates a sectional view of the blade including a plurality of serrations along a lateral side of the blade, in accordance with a representative embodiment;

FIG. 9 illustrates an elevation view of the handle, in accordance with a representative embodiment;

DETAILED DESCRIPTION OF THE INVENTION

The present invention relates to shovels. More particularly, some embodiments of the described invention relate to detectorist, metal detectorist, and/or treasure hunting shovels. While the described shovels can include any suitable component, in some cases, they include a blade, a shaft, a handle, a handgrip, a coupling component, a collar, and/or any other suitable component. In some cases, the handgrip is located at a center of a weight of the shovel, such that approximately half of a weight of the shovel is distributed on each side of the handgrip. In some cases, the shaft is oriented at an angle relative to the blade, and the handle is optionally oriented at an angle relative to the shaft. In some cases, the coupling component is located along the shaft and is configured to selectively and removably connect at least a first modular section of the shaft to a second modular section of the shaft. In some cases, the coupling component is configured to only fully engage when the first modular section and the second modular section are in a single orientation with respect to each other.

As used herein, the term shovel and variations thereof may refer to any suitable handheld digging device that comprises a shovel blade and a shaft and that can be used to move material from one place to another in accordance with one or more embodiments of the described systems and methods. Some examples of such shovels include, but are not limited to, long-armed shovels, modular shovels, foldable shovels, mini or handheld shovels, flat shovels, square shovels, pointed shovels, round shovels, edging shovels, post hole diggers, scoop or snow shovels, tree planting shovels, trenching shovels, root shovels, planting trowels, mulch scoops, plug diggers, trowels, hand trowels, and/or any other suitable device. Indeed, in some cases, the term shovel (or variations thereof) may refer to a tool used for moving material (e.g., earthen material) from one place to another. More particularly, in some cases, the term shovel and variations thereof are used to refer to a treasure hunter, metal detectorist, and/or detectorist shovel.

Figure 1:
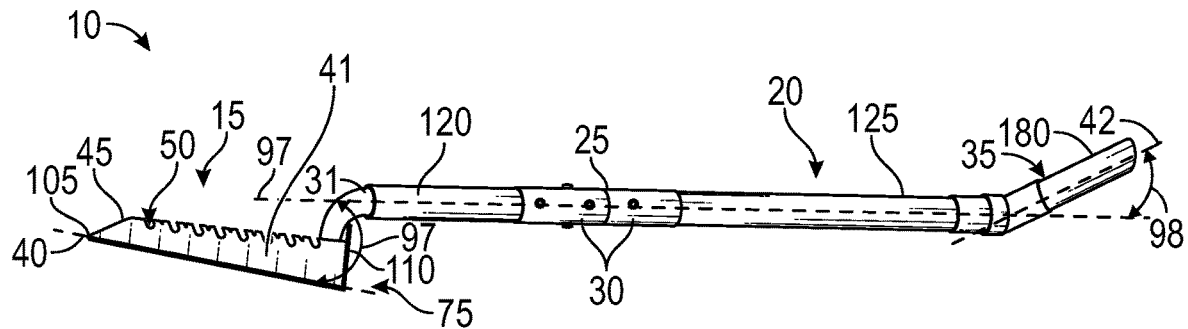
FIG. 1 illustrates a side elevation view of a shovel comprising a blade, a shaft, a handle, a handgrip, and a coupling component, in accordance with a representative embodiment.

The described shovel can comprise any suitable component that allows its user to use the shovel to move material from one place to another. While some embodiments of the described shove are configured to provide a full sized, balanced, and/or modular shovel, in some embodiments, the shovel is configured to be a relatively small, rigid, resilient, and/or handheld device. In any case, FIG. 1 shows a representative embodiment in which the described shovel 10 comprises one or more blades 15, shafts 20, coupling components 25, handgrips 30, collars 31, handles 35, first longitudinal axes 40 that extend along a length of at least a portion of the blade, second longitudinal axes 41 that extend along at least a length of a portion of the shaft, third longitudinal axes 42 that extend along at least a portion of a length of the handle, and/or any other suitable component.

With respect to the blade 15, the blade can comprise any suitable component or characteristic that allows it to be used to cut and/or hold material, and/or to transport such material from one place to another. In this regard, the blade can be any suitable shape. Some non-limiting examples of suitable blade shapes include, but are not limited to, blades that are substantially square, rectangular, rounded, pointed, tapered, bullheaded, flat, wide, narrow, slightly upcurved, asymmetrical, symmetrical, semi-circular, semi-cylindrical, fluted outward, fluted, and/or any other suitable configuration. Indeed, in some embodiments, the blade comprises a pointed tip and a V-shaped concave surface for carrying materials. By way of non-limiting illustration, FIG. 2 shows a representative embodiment in which the described blade 15 is pointed.

Figure 2:
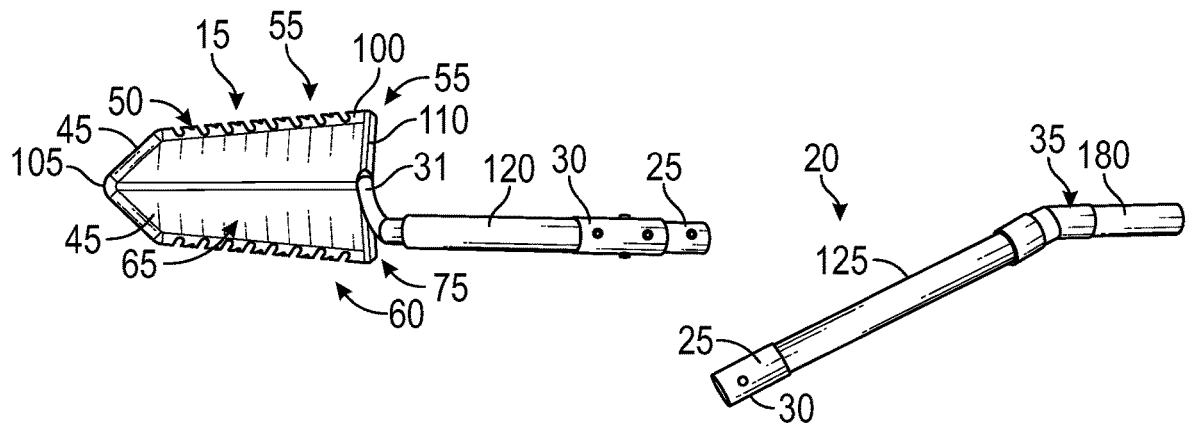
FIG. 2 illustrates a perspective view of the shovel, wherein a first modular section of the shaft is uncoupled from a second modular section of the shaft, in accordance with a representative embodiment.
Figure 3:
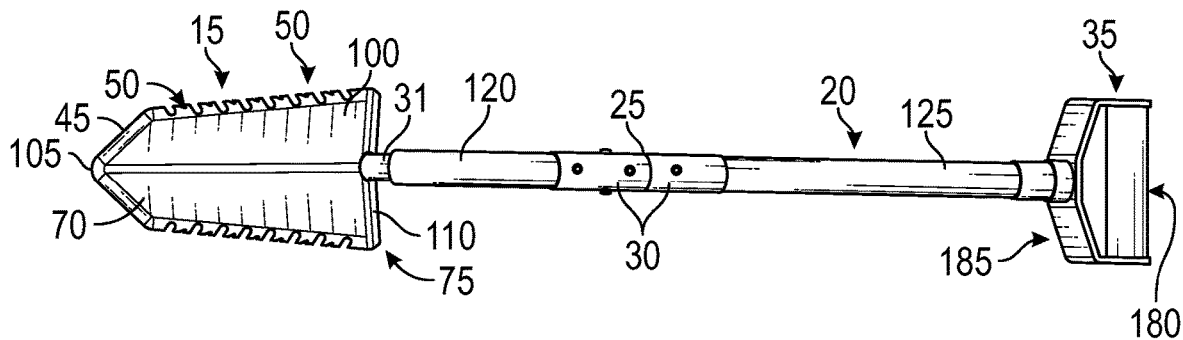
FIG. 3 illustrates a bottom plan view of the shovel, in accordance with a representative embodiment.

Moreover, although the front face and the back face of the blade 15 can have any suitable characteristic (e.g., being substantially planar, flat, convex, concave, V-shaped, and/or any other suitable shape), FIGS. 2-3 show that in some embodiments a first (or front) face 65 of the shovel 10 comprises a concave portion (e.g., a V-shaped and/or any other suitable concave portion), while a second (or back) side 70 of the shovel 10 comprises a convex portion. In particular, FIG. 2 shows a representative embodiment in which the first face 65 of the blade is concave and FIG. 3 shows a representative embodiment in which the second face 70 of the blade is convex. In this regard, a concave first face allows some embodiments of the shovel to scoop and hold material.

In addition to the aforementioned components, the blade 15 can include any other suitable component. For instance, FIGS. 1-3 show that some embodiments of the blade 15 include one or more cutting edges 45, serrated teeth 50, lateral sides (e.g., a first lateral side 55 and/or a second lateral side 60), and/or other suitable component.

Where the blade 15 includes one or more serrated teeth 50, the teeth can have any suitable characteristic, including, without limitation, opening in any direction, having any suitable pattern, being disposed in any suitable location on the blade, being any suitable size, being tapered, being sharpened, having an undulated surface, having a smooth surface, and/or otherwise being configured to help the blade cut through one or more materials. By way of non-limiting illustration, FIG. 2 shows a representative embodiment in which the described blade 15 includes a plurality of serrated teeth 50 extending along at least the first lateral side 55 of the blade 15. Additionally, FIG. 8 shows a representative embodiment in which a plurality of serrated teeth 50 are disposed on the first lateral side 55 of the blade 15.

Where the blade 15 comprises one or more serrated teeth 50, the serrated teeth can have any suitable shape (e.g., being zig-zagged, comprising a combo edge (or one wide serration followed by two or more thinner serrations), comprising a double row serration, comprising a Veff serration, comprising a triple point serration, comprising a Veff flat top serration, comprising one or more large scallops followed by one or more smaller scallops, and/or having any other suitable shape). In some embodiments, however, each of the plurality of serrated teeth include at least two points 80 and a trough 85, with the trough being disposed between the two points.

In this regard, the troughs 85 of each of the plurality of serrated teeth 50 can open in any suitable direction (e.g., perpendicularly to, at an obtuse angle to, at an acute angle to, and/or in any other suitable manner with respect to the first longitudinal axis 40 of the blade 15). By way of non-limiting illustration, FIG. 8 shows an embodiment in which the troughs 85 are disposed along the first lateral side 55 of the blade 15 and extend into the blade 15 in a first direction 90 with respect to the first longitudinal axis 40. In this regard, the first direction (illustrated as 90) can be any suitable direction that allows the serrated teeth to cut a material. Indeed, in some embodiments, the first direction is between about 15 degrees and about 165 degrees (or within any subrange thereof) with respect to the first longitudinal axis (e.g., when such angle opens towards a tip or bottom end 105 of the blade). For instance, some embodiments of the blade define one or more troughs that extend at an angle (e.g., the first direction) that is between about 20 degrees and about 60 degrees (or within any subrange thereof) relative to the first longitudinal axis of the blade. Indeed, in some embodiments, the first direction runs at an angle that is about 50 degrees±5 degrees with respect to the first longitudinal axis and in which the first angle opens towards a tip of the blade.

Figure 12:
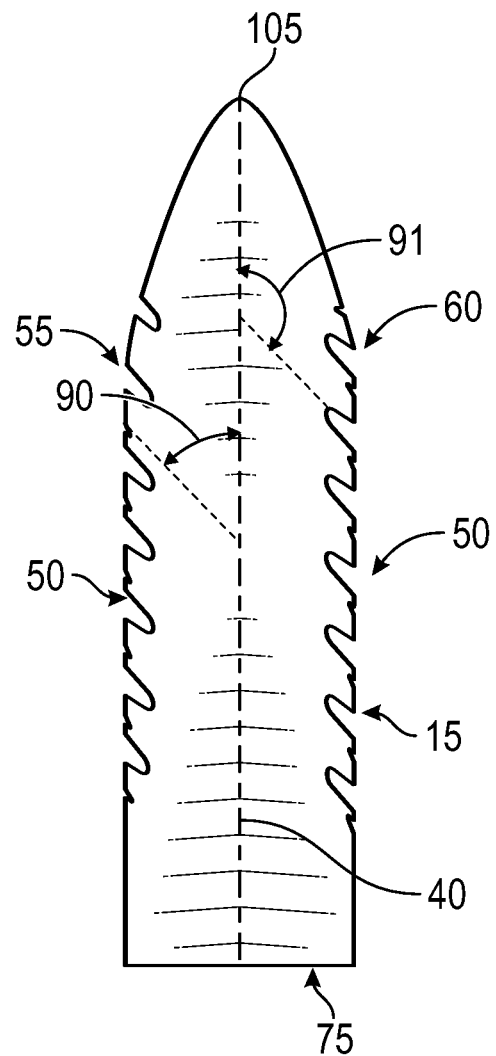
FIG. 12 illustrates top plan view of the hand digger blade, in accordance with a representative embodiment.
Figure 13:
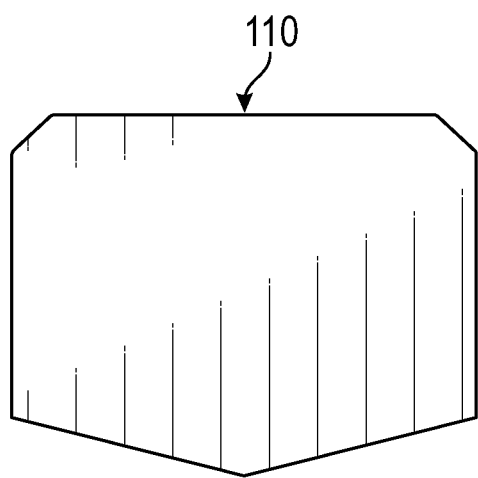
FIG. 13 illustrates an elevation view of the hand digger plate, in accordance with a representative embodiment.

In some embodiments, blade 15 comprises a plurality of teeth 50 that are disposed along the second lateral side 60 of the blade. In such embodiments, the teeth and troughs 85 on the second lateral side (and/or in any other suitable location) can have any suitable orientation (e.g., opening a direction that mirrors the first direction 90, opening at in a second direction, and/or having any other suitable configuration). Indeed, in some embodiments, the plurality of serrated teeth on the second lateral side of the of the blade run in any suitable direction, including in any suitable direction mentioned above for teeth on the first lateral side of the blade. In some embodiments, the blade comprises a plurality of serrated teeth that extend along the second lateral side 60 of the blade, and the troughs of each of the plurality of serrated teeth along the second lateral side of the blade extend into the blade in a second direction 91 (e.g., with the first direction 90 opening towards a cutting edge, tip, or bottom end 105 of the blade and the second direction 91 opening towards the back end (or heel end 75) of the blade 15, as shown in FIG. 12). In some such embodiments, the second direction is at an angle 91 (e.g., as shown in FIG. 12) that is between about 120 degrees and about 160 degrees (or within any subrange thereof) relative to the first longitudinal axis 40 of the blade (with respect to the bottom end of the blade). Indeed, in some embodiments, the second direction runs at an angle that is about 130 degrees±5 degrees with respect to the first longitudinal axis where the angle opens towards the bottom end of the blade (e.g., about 50 degrees±5 degrees with respect to the first longitudinal axis where the second angle opens towards the heel end of the blade). Additionally, in some embodiments, one or more teeth and/or troughs on the first lateral side of the blade run in the second direction (as described above).

Figure 20:
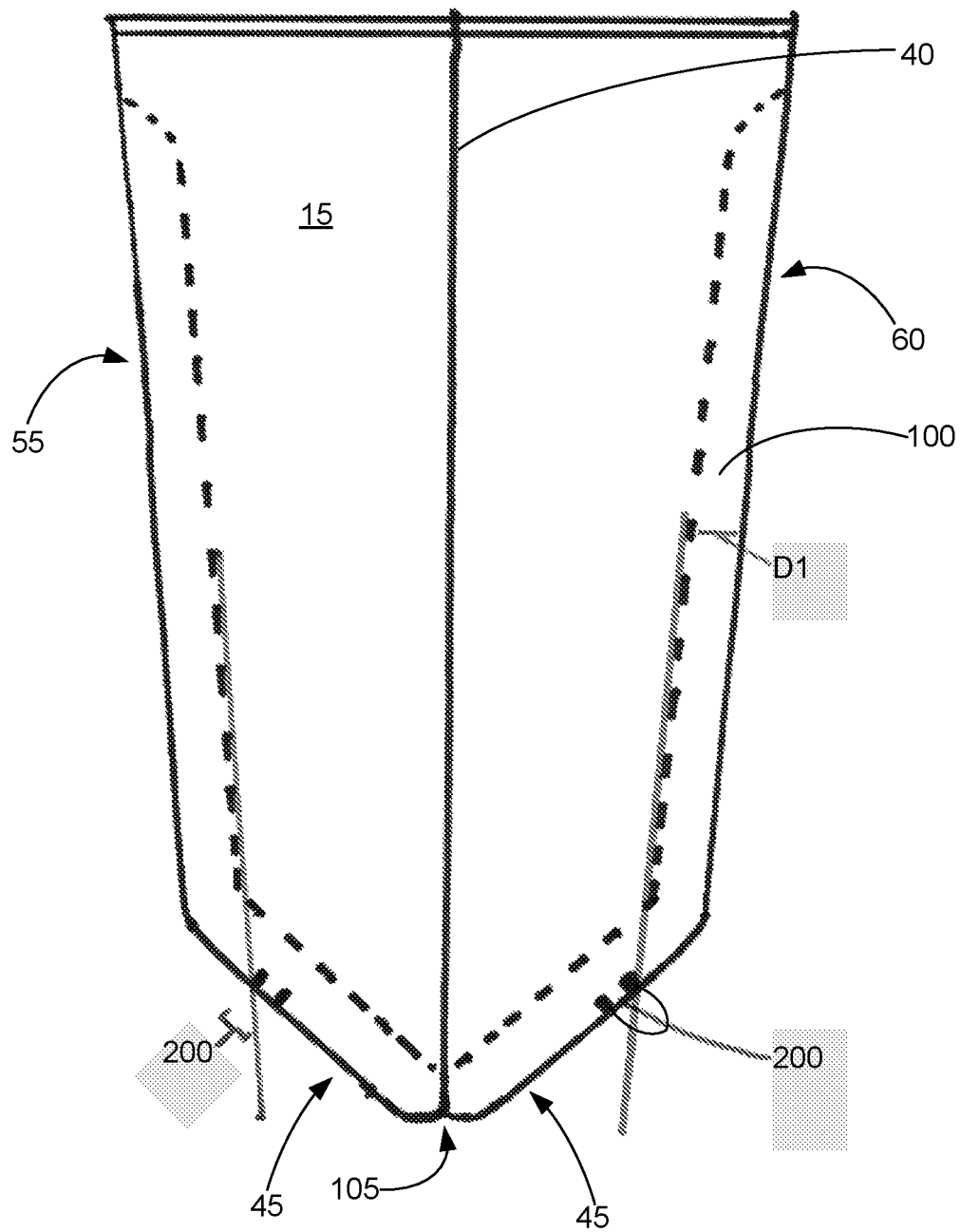

In some embodiments, one or more edges of the described blade 15 include a chamfered surface, a chisel grind, and/or any other suitable form of beveled edge (or bevel) 100. In this regard, the bevel can be disposed in any suitable location, including, without limitation, at the first face 65 and/or the second face 70 of the blade and on one or more lateral sides and/or cutting edges of the blade. Indeed, in some embodiments, the bevel is disposed on the second face 70 of the blade 15 (i.e., where the shovel 10 comprises a hand trowel, such as the one drawn in FIG. 11). In some other embodiments, however, the blade comprises a beveled edge that is disposed on the first face of the blade and that extends along the first lateral side 55 of the blade, the second lateral side 60 of the blade, the cutting edge 45, and/or any other suitable portion of the blade. In such embodiments, the bevel can perform any suitable function. Indeed, in some cases, the bevel creates a cutting surface that enables the blade to: easily penetrate challenging terrain; readily cut roots, sod, wood, and/or other materials; and/or to further facilitate scooping and holding excavated material. Additionally, in some embodiments, the bevel increases the durability of the shovel. Moreover, in some cases, the bevel is configured to allow one or more edges of the blade to be sharpened as the blade is forced into soil (and/or any other suitable material).

Where one or more portions of the blade 15 comprises a chisel grind and/or any other type of beveled edge 100, the bevel can extend any suitable distance D1 into the blade 15 from a perimeter of the blade (e.g., as shown in FIG. 20), including, without limitation, between about 0.5 mm and about 5 cm (or within any subrange thereof). Indeed, in some embodiments, the bevel extends between about 0.4 cm and about 1.3 cm into the blade from a corresponding edge of the blade.

While some embodiments of the blade 15 have a relatively flat tip at the bottom end 105, some embodiments (as mentioned earlier) comprise one or more pointed tips. By way of non-limiting illustration, FIG. 3 shows a representative embodiment in which the cutting edge 45 comprises a pointed tip located at the bottom end 105 of the shovel 10. While such a tip can perform any suitable function, in some cases, the tip helps the blade to be stabbed, and to cut, into the ground or another material relatively easily.

In some embodiments, the blade 15 optionally comprises one or more kick plates 110 that are disposed at the heel end 75 of the blade, or at a portion of the blade that is disposed substantially opposite to the cutting edge 45 or the bottom end 105 of the blade. In such embodiments, the kick plate can perform any suitable function, including, without limitation, providing a surface that can be kicked (without cutting a foot or shoe of a user) to help drive the blade into the ground and/or any other suitable material.

Where the blade 15 comprises one or more kick plates 110, the kick plates can have any suitable characteristic that allows them to function as described herein. Indeed, in some embodiments, the blade comprises one or more discrete kick plates that are formed with, bent on, welded to, and/or that are otherwise coupled to the blade and that are disposed on either side of the shaft 20. In some such embodiments, such kick plates are indirectly coupled together by being coupled to the blade. In some other embodiments, however, the blade comprises a single kick plate that extends across a portion of the heel end 75 so as to extend to both sides (e.g., a right side and a left side, or a first lateral side 55 and a second lateral side 60) of the shaft. By way of non-limiting illustration, FIGS. 3, 4, 7, and 10D show some embodiments in which the kick plate 110 comprises a single kick plate that flanks both sides of the shaft 20. Additionally, FIG. 7 shows an embodiment in which the kick plate 110 comprises a single component that is configured to extend on both sides of the shaft 20 (not shown in FIG. 7) to provide significant strength to the blade. While a single kick plate that extends to both sides of the shaft can provide the blade with any suitable feature, in some cases, such a kick plate serves as a brace that provides a significant amount of rigidity to the blade, thus allowing blade to be kicked relatively hard, jumped on, and/or to cut through relatively rough materials.

Where the blade 15 comprises one or more kick plates 110, the kick plates can extend in any suitable direction, including, without limitation, extending over (or out from) the first face 65 and/or over (or out from) the second face 70 of the blade. By way of non-limiting illustration, FIGS. 1-4 show some embodiments in which the kick plate 110 extends over the first face 65 of the blade 15. Moreover, while the kick plate can contact any suitable portion of the blade, FIGS. 2-3 show some embodiments in which the kick plate 110 is coupled on most, if not all, of an upper perimeter of the blade 15. While having the kick plate extend away from or over the first face of the blade (and/or being coupled to an upper perimeter of the blade) can perform any suitable function, in some cases, it helps strengthen the blade, helps prevent contents of the blade from slipping off of the heal end 75 of the blade, provides an additional connection point for the collar 31 (e.g., a segment of a coil spring, a hosel, etc.), and/or can perform any other suitable function.

In addition to the aforementioned features, the kick plate 110 can comprise any other suitable feature. For instance, some embodiments of the kick plate comprise one or more texturized surfaces, knurled surfaces, raised protuberances, and/or other raised features that are configured to provide traction between a user's shoe, when the shoe comes in contact with the kick plate. While such raised features can comprise any suitable characteristic, FIG. 7 shows a representative embodiment in which the described kick plate 110 includes multiple raised, welded tacks 115 that are configured to provide a gripping surface on the kick plate and/or to strengthen the kick plate.

With respect to the shaft 20, the shovel 10 can comprise any suitable shaft that allows a user to hold the shaft to hold the shovel and/or to provide the operator with leverage when using the shovel. In this regard, some non-limiting examples of suitable shafts include one or more straight shafts, curved shafts, elongated shafts, miniature shafts, tapered shafts, folding shafts, telescopic shafts, s-shaped shafts, contoured shafts (e.g., comprising a jog or bend in the shaft to help reduce the amount of time that a user needs to lean over when using the shovel), and/or any other suitable configuration. By way of non-limiting illustration, FIG. 1 shows a representative embodiment in which the shovel 10 comprises a relatively straight shaft 20.

Although some embodiments of the shaft 20 comprise a single monolithic object, some other embodiments of the shaft comprise one or more coupling components 25, modular sections (e.g., a first modular section 120, a second modular section 125, and/or any other suitable number of modular sections), handgrips 30, and/or other suitable components that allow portions of the shovel to be disconnected and/or reconnected with other portions of, or to accessories to, the shovel. Accordingly, in some embodiments, the shovel is configured to be broken down for travel (e.g., to be packed in a backpack, car, bag, ATV, side-by-side, luggage, and/or in any other suitable location) and/or to be modified (e.g., by removing one or more components, replacing one or more components with one or more different components, and/or by otherwise modifying the shovel). Indeed, FIGS. 10A-10F show that in some embodiments in which the shaft 20 comprises one or more coupling components 25, such components can allow a user to: easily modify a length of the shaft 20, remove a component from the shovel (e.g., a portion of a length of the shaft), change out handles 35, change out blades (e.g., with one or more other blades and/or other components), make the shovel 10 lighter, and/or to otherwise modify the shovel in any suitable manner.

Figure 10A:
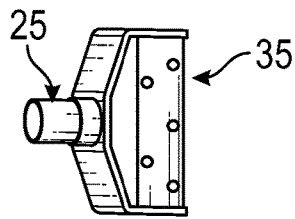
FIG. 10A-10F illustrate top plan views of a variety of modular sections of the shovel, in accordance with some representative embodiments.
Figure 10B:
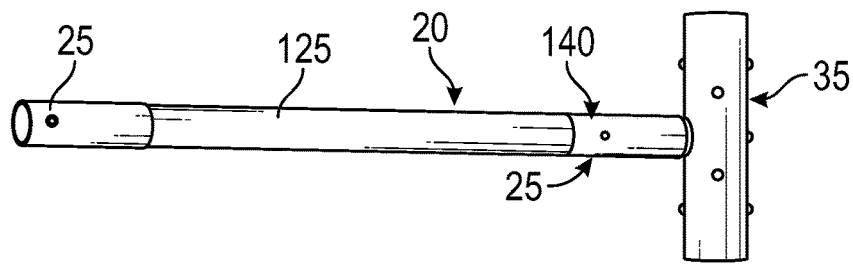
Figure 10C:
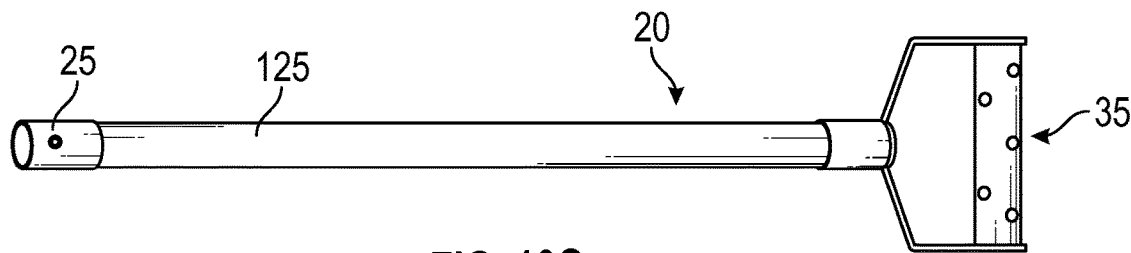
Figure 10D:
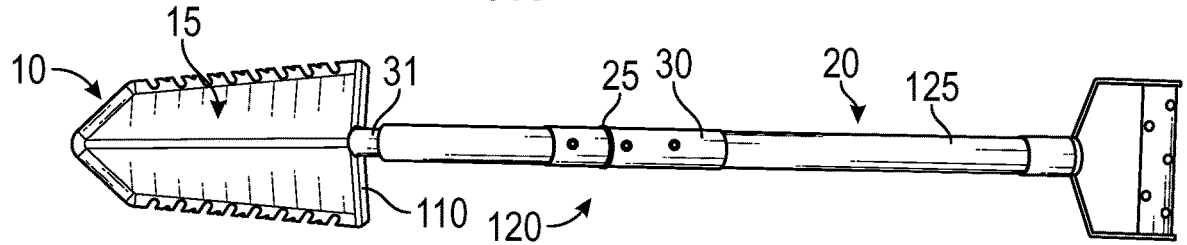
Figure 10E:
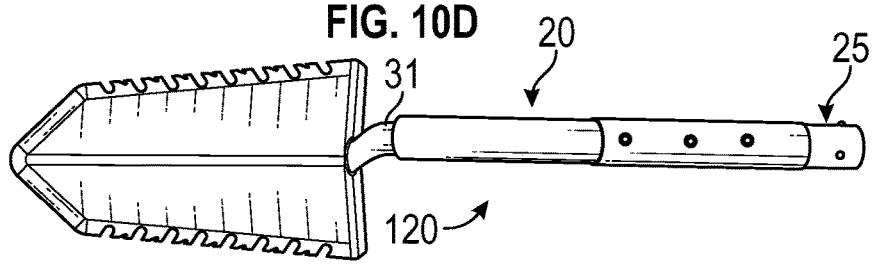
Figure 10F:
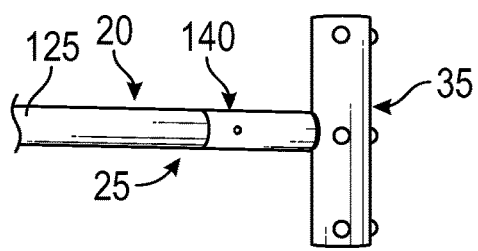

With respect to the coupling component 25, the coupling component can be configured in any suitable manner that allows two or more components of the shovel 10 to be selectively and removably connected to each other. In this regard, some non-limiting examples of coupling components include one or more threaded connections, clamps, adhesives, flange connections, cotter pins, taper fittings, rivets, frictional engagements, mechanical engagements, detent mechanisms, quick-release mechanisms, splines, teeth, male and female couplers, catches, and/or any other suitable components that are capable of coupling one or more portions of the shovel together. Indeed, in some embodiments, the coupling component comprises one or more openings that extend through two or more portions of the shovel and that are configured to align so that one or more pins, detents, pawls, resilient buttons, double end D style spring leg snap buttons of any suitable size (including, without limitation, 0.25" D×0.28" H), and/or other components can be inserted through the openings to couple the various components together.

Where the shovel 10 comprises one or more coupling components 25 (or couplers), the couplers can be disposed in any suitable location and can be configured to perform any suitable function. Indeed, in some embodiments, the shovel comprises a coupler that is configured to couple the blade 15 to the shaft 20 and/or to the handle 35. In some embodiments, the shovel comprises a coupling component that is configured to selectively couple the shaft and the handle. In still other embodiments, the shovel comprises a coupling component that is configured to selectively couple and decouple one portion of the shaft to another portion of the shaft and/or to the handle. Indeed (and as shown in FIGS. 10A-10E), in some embodiments, the coupling component 25 is configured to selectively and removably connect a first modular section 120 of the shaft 20 to a second modular section 125 of the shaft and/or to the handle 35. Additionally, FIG. 10F shows an embodiment in which the coupler 25 is configured to couple one or more handles 35 to the first modular section 120, the second modular section 125, and/or to any other suitable portion of the shovel 10.

Where the two or more sections of the shaft 20 (e.g., sections 120 and 125) and/or any other suitable components of the shovel 10 (e.g., handles 35, blades 15, and/or any other suitable components) are configured to couple to (and/or decouple from) each other such that the two sections (and/or other components) have any suitable rotational orientation with each other. Thus, in some embodiments, one or more portions of the shovel are configured to be coupled together in multiple rotational orientations (e.g., the handle can be coupled to the shaft 20 in multiple different orientations with respect to the first face 65 of the blade, and/or any other suitable component can be rotated with respect to, and be selectively coupled to, another component of the shovel in multiple orientations).

In some other embodiments, however, two sections of the shaft (and/or any other suitable components) are configured to fully couple with each other (e.g., to have the coupling component 25 be fully engaged) when the two sections (and/or two components) are in a single, desired rotational orientation. In some cases, by having the portions of the shaft (and/or one or more other components) couple together in a single orientation, the shovel is configured to help maintain one or more of the various angles between the shaft, handle 35, and/or the blade 15 (e.g., to preserve the desired leverage offered by some embodiments of the shovel 10).

Where the coupling component 25 is configured to fully engage only when two sections of the shaft 20 (and/or two other components, such as a section of the shaft and a handle 35) are in a single rotational orientation with respect to each other, the coupling mechanism and/or the two sections of the shaft can couple together in any suitable manner. Indeed, in some embodiments, an end portion of one or both of the modular sections comprise one or more teeth and corresponding grooves, offset splines, lock and key configurations, and/or are otherwise keyed to prevent the two sections (and/or one or more other components) from coupling together in one or more undesired rotational orientations.

Figure 14:
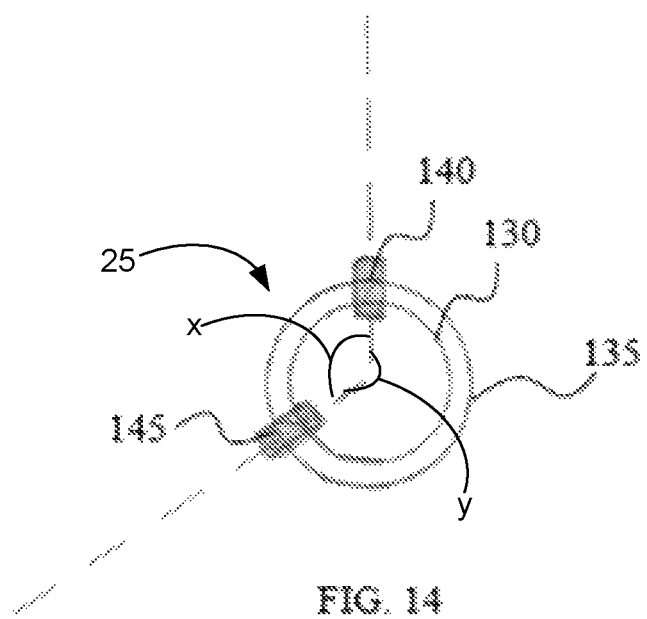
FIG. 14 illustrates a cross section view of the coupling component comprising a push button assembly, in accordance with a representative embodiment.
Figure 15:
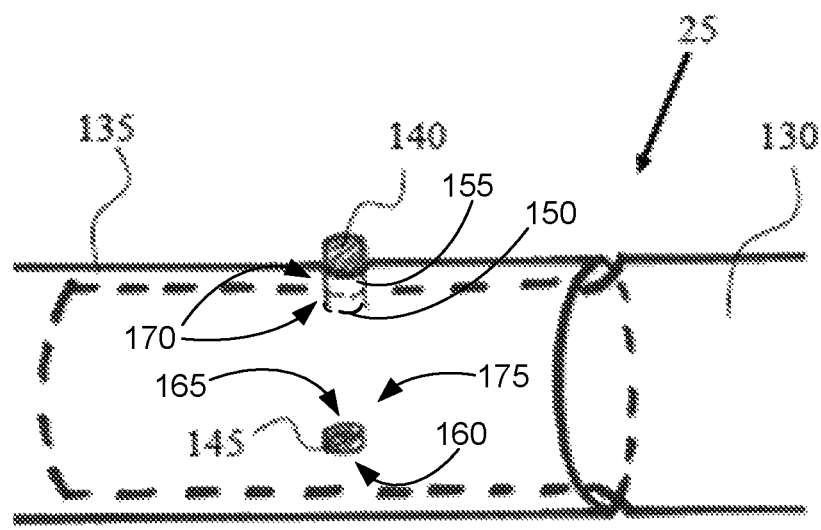
FIG. 15 illustrates a side prospective, semi-transparent view of the coupling component comprising a push button assembly, in accordance with a representative embodiment.
Figure 16:
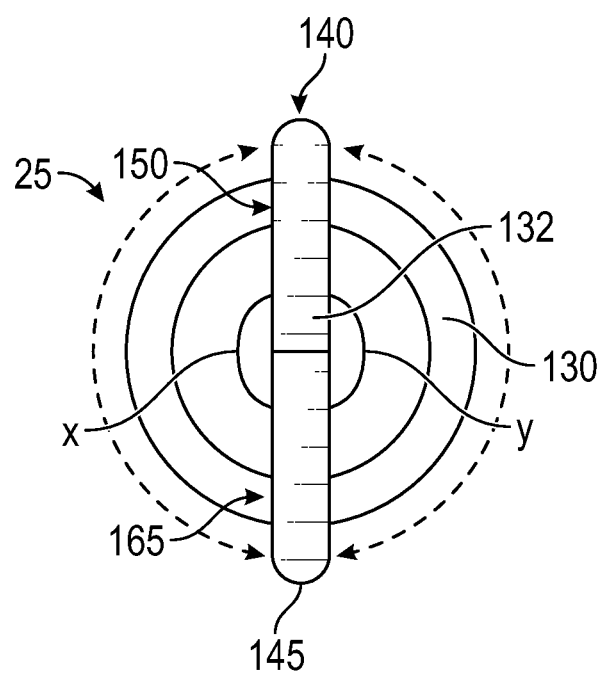
FIG. 16 illustrates a cross section view of an interfitting member of the coupling component, in accordance with a representative embodiment.
Figure 17:
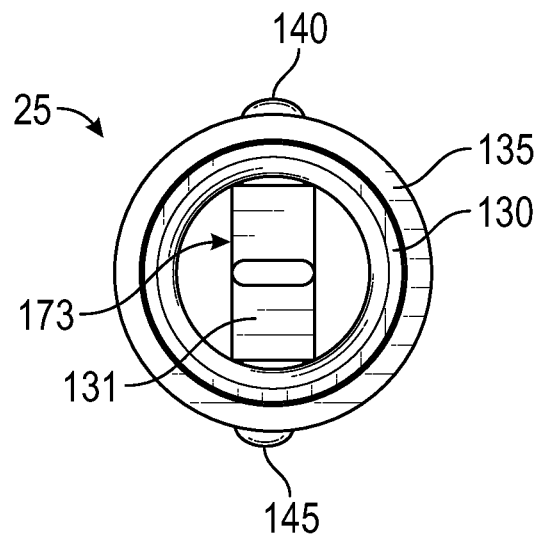
FIG. 17 illustrates a cross section view of the coupling component, in accordance with a representative embodiment.
Figure 18:
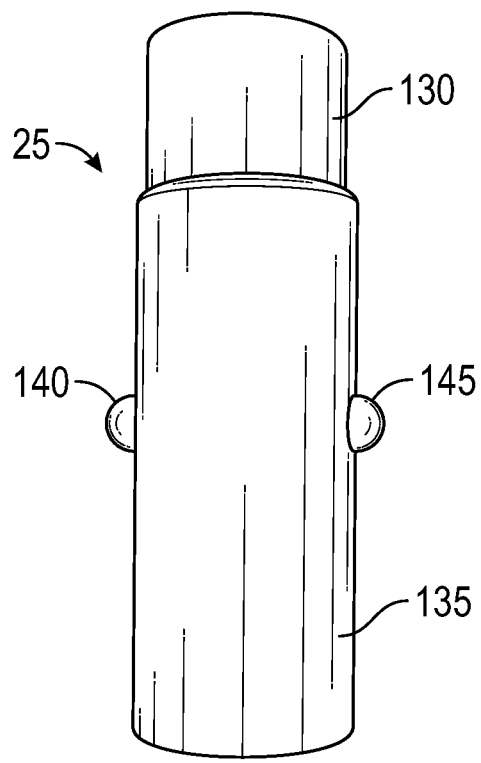
FIG. 18 illustrates a view of the coupling component, in accordance with a representative embodiment.

In some such embodiments, the coupling component 25 is configured to allow at least the first modular section 120 of the shaft 20 (and/or any other suitable components) to selectively and removably, fully couple with the second modular section 125 of the shaft (and/or any other suitable component, such as the handle 35) in a single, rotational orientation with respect to each other. While this can be accomplished in any suitable manner, FIGS. 15-18 show some representative embodiments in which the described coupling component 25 comprises a push button mechanism. Indeed, FIG. 17 shows that, in some embodiments, the coupling component 25 comprises a double end D style spring leg snap button assembly 173. Additionally, FIGS. 14, 16, and 17 show various cross-section views of some representative embodiments of the described coupling component 25 (i.e., an interfitting component 130 that includes one or more D style 131 and/or V style 132 springs).

In accordance with some embodiments in which the coupling component 25 comprises one or more push button mechanisms, the push button mechanism includes an interfitting member 130 and an outerfitting member 135. In some such embodiments, the interfitting member incudes a first push button 140 and/or a second push button 145. Moreover, in some embodiments, a first hole 150 in the interfitting member is configured to align with a second hole 155 in the outerfitting member to create a first set of corresponding holes 170, and a third hole 160 in the interfitting member is configured to align with a fourth hole 165 (e.g., when the first and second holes align) in the outerfitting member to create a second set of corresponding holes 175.

While the first 170 and second 175 sets of corresponding holes can be offset from each other by any suitable angle (e.g., by about 180 degrees), in some embodiments, the first set of corresponding holes and the second set of corresponding holes are offset from each other by less than (or more than) one hundred and eighty (180) degrees (see e.g., the radial displacement X in FIG. 16 between the first 140 and second 145 buttons), including any suitable amount less than 180 degrees (e.g. about 176 degrees±3 degrees; or any other suitable amount) that allows the first and second buttons to function. Thus, in some embodiments, the first set of corresponding holes and the second set of corresponding holes are offset from each other by more than one hundred and eighty (180) degrees (see e.g., the radial displacement Y in FIG. 16 between the first 140 and second 145 buttons), including any suitable amount more than 180 degrees (e.g., about 184 degrees±3 degrees; or any other suitable amount). In some such embodiments, the first push button 140 is configured to extend through and/or beyond the first set of corresponding holes and the second push button 145 is configured to extend through and/or beyond the second set of corresponding holes to selectively and removably connect the interfitting member to the outerfitting member. Accordingly, in some embodiments, the two push buttons are only both able to fully engage and couple the sections of the shaft (or any other combination of components of the shovel) together when the sections (or components) are in a set rotational orientation with respect to each other. Additionally, such a coupler allows the various components to be selectively decoupled from each other. By way of non-limiting illustration, FIG. 2 shows a representative embodiment in which the first modular section 120 of the shaft 20 is uncoupled from the second modular section 125 of the shaft 20.

With respect to the handgrip 30, the handgrip can be configured in any suitable manner that provides a surface wherein the operator can grasp and/or carry the shovel 10. In this regard, some non-limiting examples of handgrips include one or more handgrips comprising rubber; leather; one or more surfaces with divots, ribbed surfaces, raised weld tacks, knurling, texturization, and/or any other suitable gripping surface; texturized coatings; and/or any other suitable material and/or configuration. Indeed, in some embodiments, the handgrip comprises one or more raised welded tacks and/or other protuberances (see e.g., FIG. 6 at 115). In this regard, where the shovel 10 comprises one or more raised tack welds and/or other protuberances (e.g., on the handgrip and/or any other suitable portion of the shovel), the raised tacks can perform any suitable purpose, including, without limitation, comfortably grabbing into and/or holding onto the user's gloves and/or skin so that the user can easily grasp the shovel in muddy, wet, and/or otherwise slippery conditions. In this regard, in some cases, it can be very difficult to grip some embodiments of the handle in wet and/or muddy conditions without such tack welds.

Additionally, where the shovel 10 comprises one or more raised tacks, the tacks (or other protuberances) can be disposed in any suitable pattern (e.g., in straight lines, in a grid pattern, in an offset grid pattern, and/or any other suitable pattern). Moreover, in some such embodiments, the first 140 and/or second 145 push buttons replace (or are otherwise part of the pattern with) one or more or the raised protuberances of the handgrip.

Where the shaft 20 comprises one or more handgrips 30, the handgrip can be disposed in any suitable location on the shaft, including, without limitation, towards the blade, towards the handle 35, at a point on a length of the shaft, and/or in any other suitable location. In some embodiments, however, the handgrip is disposed at a center of a weight of the shovel (and not necessarily at a center of a length of the shovel). By way of non-limiting illustration, FIG. 1 shows a representative embodiment in which the handgrip 30 is located at a center of weight of the shovel 10 such that a weight of the shovel from the handgrip (and/or from a center of a length of the handgrip) to the bottom end 105 of the shovel is substantially equal to (e.g., ±5% by weight) a weight of the shovel from the handgrip (e.g., and/or from the center of the length of the handgrip) to a top end 180 of the shovel. In some such embodiments, such a location of the handgrip provides a balanced, ergonomic way to carry the shovel. Accordingly, in some cases, by having the handgrip disposed at a center of a weight of the shovel, a user is able to carry the shovel longer with less exhaustion than would be caused by carrying an unbalanced shovel (or by carrying a shovel at an unbalanced location).

The shaft 20 and the blade 15 of the shovel 10 can couple with each other in any suitable manner. Indeed, in some embodiments, the shaft couples directly to the blade. In some other embodiments, however, an intermediary member, a hosel, and/or any other suitable type of collar 31 couples the shaft to the blade.

With respect to such collar, the collar can be configured in any suitable manner that provides a connection between the blade 15 and the shaft 20. In this regard, some non-limiting examples of collars include one or more necks, rods, pipes, braces, springs, resilient members, arched resilient members, coil spring segments, arched members, and/or any other suitable component. Indeed, in some embodiments, the collar comprises one or more of the above-mentioned characteristics. By way of non-limiting illustration, FIG. 1 shows a representative embodiment in which the collar 31 comprises an arch-shaped member. Moreover, in some such embodiments, such a collar comprises an arch-shaped resilient member (e.g., spring, a segment of an automotive coil (e.g., a segment of a shock coil), and/or any other arch-shaped resilient member) that connects the shaft 20 to the heel end 75 of the blade 15. In this regard, such a resilient member can perform any suitable function. Indeed, in some embodiments in which a spring is used to connect the blade to the shaft, the spring is configured to undergo some deflection and return to its original state without suffering permeant deformation. In this way, a shovel operator can apply a forceful load to the shovel without causing permeant damage to the shovel.

Where the collar 31 comprises an arch-shaped resilient member, the resilient member can be configured to bear any suitable amount of force and while still being resilient. Indeed, in some embodiments, the collar is configured to be resilient (e.g., to not be permanently bent and/or otherwise damaged) when it bears between about 10 kg and about 2,000 kg of load (or a load within any subrange thereof) between the shaft 20 and the blade 15. Indeed, in some embodiments, the arch-shaped resilient member is configured to be resilient and to continue to function properly when exposed to loads of between about 20 kg and about 600 kg between the shaft and the blade.

The collar 31 (e.g., a segment of an automotive coil spring) can be any suitable length, including, without limitation, being between about 5 mm and about 25 cm (or within any subrange thereof) between an end of the shaft 20 and the first face 65 of the blade 15. Indeed, in some embodiments, the collar is between about 2 cm and about 15 cm (or within any subrange thereof). Moreover, the collar can be any suitable diameter (or have any suitable width) that allows it to function as intended. Indeed, in some embodiments, the collar has a diameter (or width) that is between about 5 mm and about 5 cm (or within any subrange thereof). For instance, some embodiments of the collar are between about 8 mm and about 1.8 cm in diameter (or within any subrange thereof).

The collar 31 can be any suitable shape (e.g., being a segment of a circle, being arch-shaped, being straight, running at an angle between the blade 15 and the shaft 20, being curved, being bent, comprising a truss, and/or having any other suitable shape. By way of non-limiting illustration, FIGS. 1, 2, 10D, 10E, and FIG. 19 show some embodiments, in which the collar 31 comprises a segment of a circle that is coupled to, and extends between, the first face 65 of the blade 15 (and/or the kick plate 110) and the shaft 20.

With respect to the handle 35, the handle can be configured in any suitable manner that allows the operator to grip and control the shovel 10. In this regard, some non-limiting examples of handle shapes include a T-shape, U-shape, C-shape, D-Shape, triangular shape, rectangular shape, circular handle shape, ball handle, straight handle, folding spring handle, and/or any other suitable handle configuration. Indeed, in some embodiments, the handle comprises one or more of the above-mentioned characteristics (e.g., a foldable spring handle with a T-shape fitting). In one non-limiting illustration, however, FIG. 3 shows a representative embodiment in which the described handle 35 comprises a D-shaped handle 185. Additionally, FIG. 10B shows a representative embodiment of a handle 35 having a T-shape.

Where one or more portions of the shovel 10 comprise one or more longitudinal axes (e.g., the first longitudinal axis 40, the second longitudinal axis 41, the third longitudinal axis 42, and/or any other suitable longitudinal axis), the various axes can run at any suitable angle with respect to each other. Indeed, in some embodiments, in which a portion of the blade 15 comprises the first longitudinal axis 40 and a portion of the shaft 20 comprises the second longitudinal axis 41, the two axes run at an angle (as shown by 97 in FIG. 1) that is between about 0 degrees (e.g., with the two axes being parallel) and about 30 degrees (or within any subrange thereof). Indeed, in some embodiments, the first and second axes run at an angle 97 that is about 14 degrees±10 degrees (e.g., between about 10 degrees and about 18 degrees). In this regard, and in accordance with some embodiments, having an angle (e.g., 97) between the blade and the shaft increases the amount of leverage an operator has when using the shovel. Indeed, in some embodiments, such an angle can help the shovel be configured to precisely dig plug-style holes.

In some embodiments, the described handle 35 includes a third longitudinal axis 42 that extends along the length of the handle (e.g., a portion of the handle that the user grabs is disposed in front of and not directly in line with the second longitudinal axis 41). In this regard, the third longitudinal axis of the handle can run at any suitable angle with respect to the second longitudinal axis of the shaft 20. Indeed, in some embodiments, the third longitudinal axis runs at an angle 98 (e.g., as shown in FIG. 1) that is between about 0 degrees (e.g., parallel with) and about 60 degrees (or within in any subrange thereof) relative to the second longitudinal axis of the shaft. Indeed, in some embodiments, the third and second axes run at an angle 98 that is about 27 degrees±5 degrees). In this regard, having an angle between the handle and the shaft increases (in some embodiments) an operator's leverage when using the shovel. In some other embodiments, at least a portion of the handle is disposed directly in line with the longitudinal axis of the shaft (e.g., the second longitudinal axis 41).

Figure 11:
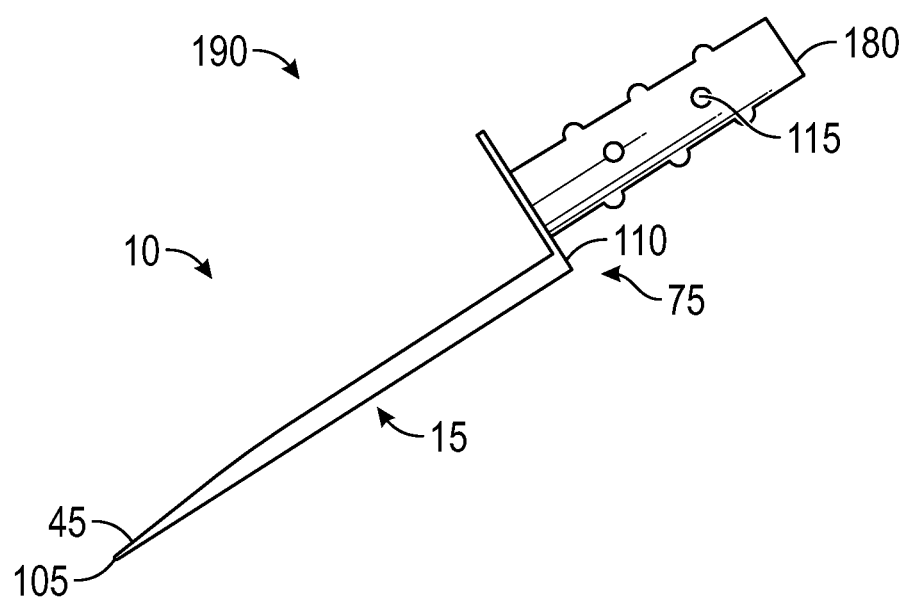
FIG. 11 illustrates a side elevation view of a hand digger comprising a hand digger blade, a hand digger plate, and a hand digger handle in accordance with a representative embodiment.

In addition to the aforementioned components, the described shovel 10 can be modified in suitable manner that allows it to function as intended. In one example, some embodiments of the described device optionally comprise a first modular section 120 and a second modular section 125 of the shaft 20, while in some other embodiments (as shown in FIG. 11), a handle 35 may be attached to the heel end 75 of the blade 15, creating a hand shovel or hand trowel 190. In another example, some embodiments of the device optionally comprise a D-shape 185 handle, while in some embodiments, the device comprises a T-shaped handle or a straight handle. In yet another example, some embodiments of the shovel 10 optionally comprise the shaft at various lengths between about 2 cm and about 180 cm (or within any subrange thereof), while in some embodiments, the length of the shaft may be shorter or longer. Furthermore, in some embodiments, the handle includes one or more raised welded tacks (or other protuberances) 115 to provide a gripping surface on the handle.

As an additional example of a modification, the shaft 20 can have any suitable configuration, including, without limitation, being solid, being hollow, being straight, being curved, being bent, comprise tubing, and/or having any other suitable construction. In this regard, where the shaft comprises tubing, the tubing can have any suitable diameter (e.g., 1"×0.058, ⅞"×0.058, and/or can comprise any other suitable size or configuration of tubing). In some such cases, the tube (e.g., a ⅞"×0.058 tube, or any other suitably sized tube) slip fits inside of another tube (e.g., a 1"×0.058 tube, or any other suitably sized tube). Additionally, in some cases, the inside diameter of a 1"×0.058 tube is about 0.884" (or has any other suitable inner diameter). In some cases, the outside diameter of a ⅞"×0.058 tube is 0.875" to form a 0.009" space (or any other suitable tolerance, e.g., between about 0.0001" and about 0.3", or within any subrange thereof) for a tight slip fit. Additionally, in some cases, any suitable length (e.g., a 3" length or any other suitable length, such as between 5 mm and 30 cm (or any subrange thereof)) of any suitable size of tube (e.g., ⅞" and) slip fits any suitable length (e.g., 1½" or any other suitable length, such as between 5 mm and 30 cm) inside each of the two pieces of the shovel. Moreover, in some cases, a tube (e.g., a ⅞" tube, or any other suitably sized tube) is welded in place on the blade end and is held together with a double-sided spring leg snap button on the handle end.

As another example and with respect to the coupler component 25, in some cases, the double-sided snap buttonholes (the first 165 and second 170 sets of holes) are offset (as described above). In some such embodiments, the circumference of a tube (e.g., a 1" tube, or any other suitable sized tube, for instance, between 0.3" and between 4", or within any subrange thereof) can be any suitable size (e.g., about 3.14", or any other suitable size). Moreover, in some cases, the double-sided snap fit holes are offset by any suitable distance (e.g., about ¹⁄₁₆" (or any other suitable distance)). Furthermore, in some cases, the holes are center to center any suitable distance (e.g., 3.07" and 3.20" center to center) from the other direction. This design (as described) prohibits the user (in accordance with some embodiments) from connecting the handle backwards by only allowing one snap to lock, instead of two, with the lack of the two snaps or buttons from locking being an indicator to the user that the handle is on backwards.

Figure 19:
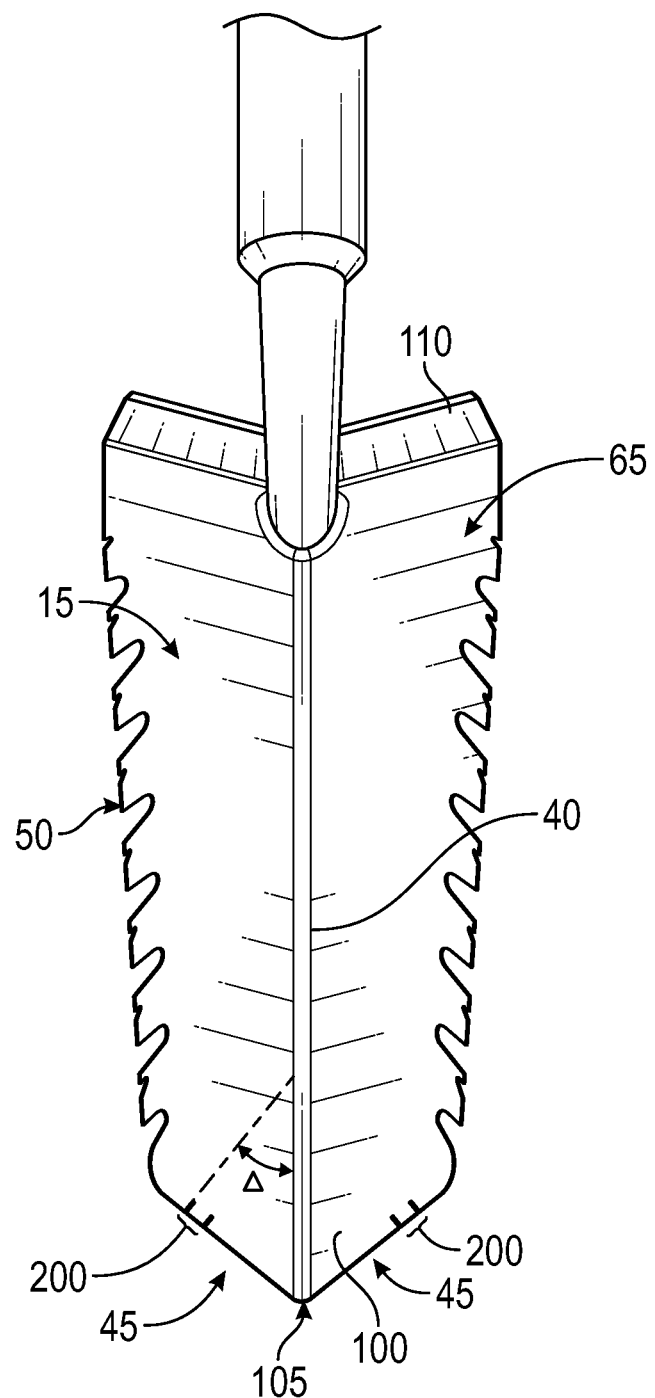
FIGS. 19-20 each illustrate a face view of the blade comprising a plurality of recesses, in accordance with some representative embodiments.

As still another example of a suitable modification, some embodiments of the blade 15 comprise one or more serrations and/or any other suitable type of recesses (or dew claws) and/or projections that are formed in (and/or on) the cutting edge 45 of the blade (e.g., the bottom end of 105 of the shovel 10). Indeed, in some embodiments, the cutting edge of the blade comprises 1, 2, 3, 4, 5, 6, 7, 8, 9, 10, or more recesses. By way of non-limiting illustration, FIGS. 19 and 20 show some embodiments in which the cutting edge 45 of the blade 15 comprises four recesses 200.

Where the cutting edge 45 of the blade 15 comprises one or more recesses 200, such recesses can have any suitable shape, including, without limitation, having a V-shape, U-shape, slit-shape, polygonal shape, rounded shape, asymmetrical shape, symmetrical shape, straight groove, and/or any other suitable shape. By way of non-limiting illustration, FIGS. 19 and 20 show some embodiments in which the recesses 200 each comprise a straight slit shape. Additionally, where the recesses comprise a slit shape, the recesses can extend into the cutting edge at any suitable angle with respect to the longitudinal axis 40 of the blade, including, without limitation, at an angle A (as shown in FIG. 19) that is between about 1 degree and about 170 degrees, or within any subrange thereof. Indeed, in some embodiments, a longitudinal axis of one or more of the recesses run at an acute angle with respect to the first longitudinal axis 40. In some cases, for instance, one or more of the recesses run at an angle A that is between about 60 degrees and about 15 degrees (e.g., about 45 degrees±5 degrees) with respect to the first longitudinal axis 40 (e.g., as shown by angle A in FIG. 19).

Moreover, where the cutting edge 45 of the bottom end 105 of the blade 15 comprises one or more recesses 200, the recesses can extend any suitable distance into the blade, including, without limitation, between about 0.5 mm and about 2 cm (or within any subrange thereof (e.g., about 4 mm±2 mm). Furthermore, one recess 200 can be offset from another recess 200 in the cutting edge 45 by any suitable distance, including, without limitation, by between about 1 mm and about 25 cm (or within any subrange thereof). Indeed, in some embodiments, two recesses are separated by about 6 mm±3 mm. In any case, where the cutting edge of the blade comprises one or more recesses, such recesses can perform any suitable function, including, without limitation, helping the blade to cut through thick roots and rough materials relatively easily. Additionally, in some embodiments, as the recesses wear, they create a ripple in the cutting edge that further allows the edge to cut through thick and/or rough materials (e.g., through sage brush roots and/or any other suitable materials).

The various components of the described shovel 10 (e.g., the blade 15, the shaft 20, the coupling component 25, the collar 31, the handle 35, and/or any other portion of the shovel) can comprise any suitable material, including, without limitation, one or more types of metal (e.g., one more types of steel, aluminum, 4130 chrome-poly, AR500 steel, and/or any other suitable metal), metal alloys (e.g., one or more types of chromium molybdenum, stainless steel, etc.), ceramics, fiberglass, plastics (e.g., polyethylene, high density polyethylene plastic, ultra-high-molecular-weight polyethylene, polypropylene, polyvinyl chloride, and/or any other suitable plastics), rubbers, polymers, pre-preg. aramid fibers, woods, carbon fibers, natural materials, synthetic materials, ultra-high-molecular weight (UHMW) materials (e.g., ultra-high-molecular weight polyethylene and/or other UHMW materials), and/or any other suitable materials. Indeed, in some embodiments, the blade, the shaft, the coupling component, the collar, and/or the handle comprise an aircraft-grade, chrome-moly steel.

The described shovel 10 can also be made in any suitable manner. In this regard, some non-limiting examples of methods for making the described system include, cutting, folding, grinding, bending, stamping, molding, shaping, extruding, drilling, using a computer numerical control device, connecting various pieces with one or more adhesives, mechanical fasteners (e.g., clamps, rivets, crimps, pins, brads, nails, staples, pegs, clips, screws, bolts, threaded attachments, couplers, etc.), 3D printing, additive manufacturing, welding pieces together, connecting pieces together, and/or any other suitable method that allows the described system to perform its intended functions.

Additionally, some embodiments of the one or more portions shovel 10 (i.e., any portion of the shovel) are coated with one or more coatings. While the various portions of the shovel can be coated with any suitable material (including, without limitation, one or more types of plastics, polymers, powder coatings, elastomeric polyurethane, ceramic, paint, rubber, and/or any other suitable material), in some embodiments, one or more portions of the shovel are covered with polyethylene, polyurethane, rubber (e.g., FLEX SEAL™ liquid rubber), an elastomeric polyurethane material, and/or any other suitable material.

Moreover, in some embodiments, one or more portions of the shovel 10 comprise one or more glow-in-the-dark materials to help the shovel be visible in the dark. In this regard, some non-limiting examples of such materials include zinc-sulfide; strontium aluminate; europium; lapis solaris; fluorophores; sensitizers; calcium sulfide; phosphorescent pigment; glow-in-the-dark tape, bands, paint, dyes, and/or pigments; and/or any other glow-in-the-dark materials.

In addition to the aforementioned features, the described shovel 10 can have any other suitable feature. Indeed, in some embodiments, the described shovel includes one or more telescopic components (e.g., telescoping shafts), foldable components (e.g., blades that fold with respect to the shaft, handles that fold with respect to the shaft, shafts that fold, and/or any other suitable folding component), extended shafts, shortened shafts, blades, axe heads, hammers, spear tips, knives, pry bars, pick axes, flashlights, barbs, foot handles, canes, mattocks, paint or coatings, finishes, straps, and/or any other suitable feature that allows the shovel to function as intended.

Thus, some embodiments of the current invention relate to shovels that allow an operator to move material from one place to another. More particularly, some embodiments of the described invention relate to detectorist, metal detectorist, and/or treasure hunting shovels. While the described shovels can include any suitable component, in some cases, they include a blade, a shaft, a handle, a handgrip, a coupling component, a collar, and/or any other suitable component. In some cases, the handgrip is located at a center of a weight of the shovel, such that approximately half of a weight of the shovel is distributed on each side of the handgrip. In some cases, the shaft is oriented at an angle relative to the blade, and the handle is optionally oriented at an angle relative to the shaft. In some cases, the coupling component is located along the shaft and is configured to selectively and removably connect at least a first modular section of the shaft to a second modular section of the shaft. In some cases, the coupling component is configured to only fully engage when the first modular section and the second modular section are in a single orientation with respect to each other.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. Each of the various elements (alone or in any combination) of the described embodiments, implementations, figures, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., top, bottom, front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A shovel comprising:
   a blade;
   a shaft having a first modular section and a second modular section;
   a handle; and
   a coupling component configured to selectively and removably connect the first modular section to the second modular section when the first modular section and the second modular section are in a single, rotational orientation with respect to each other,
   wherein the coupling component includes a first movable catch and a second movable catch that are offset from each other about an outer perimeter of the shaft by less than 180 degrees such that the first movable catch and the second movable catch can both selectively engage and lock the first modular section and the second modular section together only when the first modular section and the second modular section are coupled together in the single, rotational orientation.

2. The shovel of claim 1, further comprising a first plurality of serrated teeth formed on the blade, wherein the first plurality of serrated teeth includes:
   a first set of points; and
   a first trough,
   wherein the first plurality of serrated teeth extend along a first lateral side of the blade, and
   wherein the first trough extends into the blade in a first direction with respect to a longitudinal axis of the blade.

3. The shovel of claim 2, further comprising a second plurality of serrated teeth that extend along a second lateral side of the blade, wherein the second plurality of serrated teeth comprise a second set of points and a second trough, and wherein the second trough extends into the blade in a second direction with respect to the longitudinal axis of the blade that is different than the first direction.

4. The shovel of claim 2, wherein the first lateral side and a second lateral side of the blade each include a bevel, and wherein the bevel is disposed on a first face of the blade, and wherein the first face comprises a concave face of the blade.

5. The shovel of claim 1, wherein the blade includes a first longitudinal axis that extends along a length of the blade, wherein the shaft includes a second longitudinal axis that extends along a length of the shaft, wherein the handle includes a third longitudinal axis that extends along a length of the handle, and wherein the second longitudinal axis of the shaft is oriented at a first angle that is between about 5 degrees and about 30 degrees with respect to the first longitudinal axis.

6. The shovel of claim 5, wherein the third longitudinal axis of the handle is oriented at a second angle relative to the second longitudinal axis of the shaft, and wherein the second angle is between about 5 degrees and about 45 degrees.

7. The shovel of claim 1, further comprising a resilient member that extends between a face of the blade and the shaft, the resilient member comprising a segment of a circle.

8. The shovel of claim 1, wherein the shaft further comprises a handgrip that is formed when the first modular section and the second modular section are selectively coupled together, wherein the handgrip comprises a first portion disposed at a first end of the first modular section and a second portion disposed at a second end of the second modular section, and wherein the first portion of the handgrip and the second portion of the handgrip each include multiple raised projections that extend outwardly from the shaft.

9. The shovel of claim 1, wherein the first movable catch comprises a first projection that is configured to extend through a first hole in the first modular section and a second hole in the second modular section when the first modular section and the second modular section are coupled together in the single, rotational orientation, and wherein the second movable catch comprises a second projection that is configured to extend through a third hole in the first modular section and a fourth hole in the second modular section when the first modular section and the second modular section are coupled together in the single, rotational orientation.

10. The shovel of claim 1, wherein the coupling component further includes an interfitting member and an outerfitting member, wherein the interfitting member incudes the first modular catch and the second modular catch, which respectively include a first push button and a second push button, wherein a first hole in the interfitting member is configured to align with a second hole in the outerfitting member to create a first set of corresponding holes, wherein a third hole in the interfitting member is configured to align with a fourth hole in the outerfitting member to create a second set of corresponding holes when the first hole is aligned with the second hole, wherein the first set of corresponding holes and the second set of corresponding holes are offset from each other by less than 180 degrees, and wherein the first push button is configured to extend through the first set of corresponding holes and the second push button is configured to extend through the second set of corresponding holes when the first modular section and the second modular section are coupled together in the single, rotational orientation.

11. The shovel of claim 1, further comprising a collar, wherein the collar comprises a spring member that connects the shaft to a heel end of the blade.

12. A shovel comprising:
a blade having a first longitudinal axis that extends along a length of the blade;
a shaft;
a first plurality of serrated teeth that is disposed along a first lateral side of the blade and that includes a first set of points and a first trough that extends into the blade in a first direction with respect to the first longitudinal axis; and
a second plurality of serrated teeth that are disposed along a second lateral side of the blade and that includes a second set of points and a second trough that extends into the blade in a second direction with respect to the first longitudinal axis that is different than the first direction wherein the first trough and the second trough are of equal lengths.

13. The shovel of claim 12, wherein the shaft further comprises a first modular section and a second modular section, and wherein the shovel further comprises a coupling component that includes a first movable catch and a second movable catch that are offset from each other such that the first movable catch and the second movable catch can only both engage and lock the first modular section and the second modular section together at a same time when the first modular section and the second modular section are coupled together in one single, rotational orientation with respect to each other.

14. The shovel of claim 12, wherein the first lateral side and the second lateral side of the blade include a bevel such that the first plurality of serrated teeth and the second plurality of serrated teach are each beveled, and wherein the bevel is formed on a concave face of the blade.

15. The shovel of claim 12, wherein the shaft further comprises first modular section, a second modular section, and a handgrip, wherein the handgrip comprises a first portion that is disposed on the first modular section, and wherein the handgrip has a second portion that is disposed on the second modular section such that the handgrip is formed when the first modular section and the second modular section are coupled together.

16. The shovel of claim 12, wherein the shovel further comprises a coupling component that includes an interfitting member and an outerfitting member, wherein the interfitting member incudes a first projection and a second projection, wherein a first hole in the interfitting member is configured to align with a second hole in the outerfitting member to create a first set of corresponding holes, wherein a third hole in the interfitting member is configured to align with a fourth hole in the outerfitting member creating a second set of corresponding holes when the first and second holes align, wherein the first set of corresponding holes and the second set of corresponding holes are offset from each other by less than 180 degrees, and wherein the first projection is configured to extend through the first set of corresponding holes and the second projection is configured to extend through the second set of corresponding holes to selectively and removably connect the interfitting member to the outerfitting member.

17. The shovel of claim 12, further comprising a collar, wherein the collar comprises an arched spring member that connects the shaft to a heel end of the blade, and wherein the arched spring member couples to and extends from a face of the blade.

18. The shovel of claim 12, wherein a recess is defined between a first point and a second point of the first set of points, wherein the first trough is disposed at a first end of the first set of points, and wherein the first trough extends further into the blade than does the recess.

19. A shovel comprising:
a blade having a first longitudinal axis that extends along a length of the blade;
a shaft having a second longitudinal axis that extends along a length of the shaft, wherein the second longitudinal axis of the shaft is oriented at an angle between about 5 degrees and about 25 degrees relative to the first longitudinal axis of the blade;
a handle having a third longitudinal axis that extends along the length of the handle, wherein the third longitudinal axis of the handle is oriented at an angle between about 15 degrees and about 45 degrees relative to the second longitudinal axis of the shaft;
a handgrip located at a center of weight of the shovel, such that a weight of the shovel from a center of the handgrip to a first end of the shovel is substantially equal to a weight of the shovel from the center of the handgrip to a second end of the shovel, the second end being substantially opposite to the first end; and
a coupling component is configured to selectively and removably connect at least a first modular section of the shaft to a second modular section of the shaft, wherein the first modular section of the shaft includes an interfitting member and the second modular section of the shaft incudes an outerfitting member, wherein the interfitting member incudes a first push button and a second push button, wherein a first hole in the interfitting member is configured to align with a second hole in the outerfitting member to create a first set of corresponding holes, wherein a third hole in the interfitting member is configured to align with a fourth hole in the outerfitting member to create a second set of corresponding holes when the first hole and the second hole align, wherein the first set of corresponding holes and the second set of corresponding holes are offset from each other by less than 180 degrees, and wherein the first push button is configured to extend through the first set of corresponding holes and the second push button is configured to extend through the second set of corresponding holes to selectively and removably allow the interfitting member to fully couple with the outerfitting member in only a single, rotational orientation.

20. A shovel comprising:

a blade;

a shaft having a first modular section and a second modular section; and a coupling component configured to selectively and removably connect the first modular section to the second modular section when the first modular section and the second modular section are in a single, rotational orientation with respect to each other, wherein the coupling component includes a first movable catch and a second movable catch that are offset from each other such that the first movable catch and the second movable catch can only both engage and lock the first modular section and the second modular section together when the first modular section and the second modular section are coupled together in the single, rotational orientation.

\* \* \* \* \*